United States Patent Office 2,898,294
Patented Aug. 4, 1959

2,898,294
WELL COMPLETION FLUIDS

Gerald G. Priest, Bryan E. Morgan, Melba L. Lytle, and Joseph A. Caldwell, Houston, and Bertie F. Birdwell, Austin, Tex., assignors, by mesne assignments, to Jersey Production Research Company, Tulsa, Okla., a corporation of Delaware No Drawing. Application December 24, 1956
Serial No. 630,026

18 Claims. (Cl. 252—8.55)

The present invention is directed to an improved well completion fluid. More particularly, the invention is directed to a well completion fluid having a low fluid loss, a controllable density, heat stability, and the property of being non-corrosive to ferrous metals to which it is exposed in well completion operations. In its more specific aspects the invention is directed to a well completion fluid which will not damage or contaminate formations or zones in the earth with which it comes into contact.

Current practice when completing well, such as oil and gas wells, through perforated casings is to have drilling fluids, such as mud, salt water, water, or oil, in the well casing and to perforate the casing with bullet, shaped charge, chemical or punch-type perforators. When the pressure of a formation traversed by the well exceeds the hydrostatic pressure of a column of oil or water at the completion depth, it is customary to use weighted salt water or normal drilling mud having a density great enough to exceed formation pressure in order to control the well while perforating the casing and performing other routine completion operations. In the case of a well filled with drilling mud when the casing is perforated, the drilling mud flows into the perforations because of the pressure differential existing between the interior of the casing and the formation. The perforations are thereby partially or completely plugged with mud and this plugging is aggravated by the heat and instantaneous pressure evolved by the propellant powder in the case of bullet perforators and the high explosive in the case of the jet or shaped charge perforators. Where chemical or punch-type perforators are employed, it is not uncommon for the drilling mud to lose water rapidly to the formation resulting in the drilling mud becoming dehydrated and forming plugs. Data are available which indicate that such plugs whether formed by dehydration of the drilling mud by heat, and/or pressure or by loss of water to the formation are difficult to remove by subsequent flow from the formation into the well bore and that the productivity of a perforated interval in a producing formation is significantly reduced. Field completion attempts of wells indicate that such plugging of the perforations may cause formations to be tested as being non-productive and thereby condemned when actually the formation may contain economically producible oil or gas. Thus, it is clear that the problem of plugging of perforations is serious and is a source of expense in well completions and of erroneous conclusions in exploratory work which may cause major hydrocarbon reserves to remain undiscovered.

Another problem which exists in perforating wells is that it is necessary to provide control of the well during perforations. This is accordingly accomplished by maintaining a hydrostatic column which exerts a pressure greater than the formation pressure exposed when the casing is perforated. However, to provide a column having a sufficient hydrostatic pressure, it is necessary to add weighting agents such as barites, sand, and other solid heavy materials to the fluid column maintained in the well.

As it has become necessary to drill deeper and deeper wells in search for petroleum-producing formations, the temperatures encountered in thesee deeper wells have increased to an extent that difficulties have been encountered. Temperatures of the order of 200° to 250° F. may be encountered in oil and gas wells. At these temperatures, certain emulsions which may be used as completion fluids may become unstable and resolve into their component parts. Also, where the emulsions contain certain halogenated hydrocarbons, such as corbon tetrachloride, at the high temperatures to which the fluids are exposed, the particular halogenated hydrocarbons may break down to form corrosive fluids which will damage ferrous metal tubing and pipe with which it may come into contact. It is, therefore, desirable to provide a heat stable emulsion which will maintain and preserve its characteristics at high temperatures encountered in deep wells and will also be non-corrosive to the ferrous metal conduits to which it comes in contact. The emulsions of the present invention are suitable adjusted for heat stability at elevated temperatures depending on the temperatures encountered. For example, an emulsion may be provided which is stable at 200° F., while another is provided which is heat stable at temperatures up to 250° F.

High temperatures may be encountered in wells ranging from 10,000 feet to about 25,000 feet in wells with a depth where usual operations are performed at from about 14,000 feet to about 18,000 feet. High well temperatures may also be encountered at lesser depths, for example, from about 6,000 feet to about 14,000 feet, depending on the area where the operations are being conducted.

In accordance with the present invention, these several problems in well, and particularly in well completion and servicing operations, are solved by providing an improved well completion fluid which has a controllable density, which is heat stable at the temperatures encountered in the wells, and which is non-corrosive to the ferrous metal conduits.

The well completion fluid of the present invention may be described briefly as consisting of an aqueous phase and an oily phase, with one of the phases containing a soluble weighting agent. The oily phase contains no less than about 10 percent by volume of tetrachloroethylene; a corrosion inhibitor is dissolved in one of the phases in a corrosion inhibiting amount, and the two phases are formed into a stable emulsion by employing a sufficient amount of an emulsifying agent.

The emulsion employed in the practice of the present invention is used in the sense of the emulsions described in Sutheimn's "Introduction to Emulsions," Chemical Publishing Company, Inc., Brooklyn, New York, 1927, page 1, where an emulsion is described as follows:

"Emulsions are intimate mixtures of two immiscible liquids, one of them being dispersed in the other in the form of fine droplets."

The emulsion of the present invention contains, dissolved in one of the components of the emulsion, a weighting agent which is soluble in one of the components. The weighting agent may be soluble either in the aqueous phase or the oily phase of the emulsion. For example, the water phase may contain a water-soluble, inorganic weighting agent.

The oily phase may suitably be a liquid hydrocarbon, such as crude petroleum and fractions thereof, such as gasoline, kerosene, gas oil, diesel oil, and the like. Suitably, the hydrocarbon may have a viscosity at 60° F. of less than about 40 centipoises.

The emulsion may either be heavier or lighter than the drilling fluid and suitably may have a density in pounds per gallon in the range from about 7 to about 18 pounds per gallon. The emulsion where lighter than the drilling fluid may have a suitable viscosity sufficient to displace the drilling mud and to prevent displacement thereof by the drilling mud. For example, the viscosity of the emulsion replacing the drilling mud may range from about 10 to about 4000 centipoises at 60° F.

There are many water-soluble, inorganic weighting agents which find use in the practice of the present invention among which may be mentioned, by way of illustration and not by way of limitation, alkali metal carbonates, alkali metal chlorides, zinc chloride, calcium chloride, and sodium chloride which are particularly useful. Examples of the water-soluble inorganic weighting agents are presented in the following table:

TABLE I

*Water soluble inorganic compounds suitable as weighting agents*

| Name | Formula | Specific Gravity |
| --- | --- | --- |
| Aluminum bromide | $AlBr_3$ | 3.01 |
| Aluminum chloride | $AlCl_3$ | 2.44 |
| Aluminum iodide | $AlI_3$ | 3.98 |
| Ammonium bromide | $NH_4Br$ | 2.33 |
| Ammonium iodide | $NH_4I$ | 2.51 |
| Ammonium nitrate | $NH_4NO_3$ | 1.72 |
| Ammonium phosphate, dibasic | $(NH_4)_2HPO_4$ | 1.62 |
| Antimony trichloride | $SbCl_3$ | 3.14 |
| Antimony trifluoride | $SbF_3$ | 4.38 |
| Barium acetate | $Ba(C_2H_3O_2)_2$ | 2.47 |
| Barium bromide | $BaBr_2$ | 4.78 |
| Barium iodide dihydrate | $BaI_2.2H_2O$ | 5.15 |
| Barium iodide hexahydrate | $BaI_2.6H_2O$ | 5.0 |
| Barium nitrite | $Ba(NO_2)_2$ | 3.23 |
| Cadmium acetate | $Cd(C_2H_3O_2)_2$ | 2.34 |
| Cadmium bromate monohydrate | $Cd(BrO_3)_2.H_2O$ | 3.8 |
| Cadmium bromide | $CdBr_2$ | 5.2 |
| Cadmium chlorate | $Cd(ClO_3)_2$ | 2.3 |
| Cadmium chloride | $CdCl_2$ | 4.05 |
| Cadmium iodide | $CdI_2$ | 5.67 |
| Cadmium nitrate tetrahydrate | $Cd(NO_3)_2.4H_2O$ | 2.45 |
| Cadmium sulfate heptahydrate | $CdSO_4.7H_2O$ | 2.48 |
| Calcium bromate monohydrate | $Ca(BrO_3)_2.2H_2O$ | 3.33 |
| Calcium bromide | $CaBr_2$ | 3.35 |
| Calcium chloride | $CaCl_2$ | 2.15 |
| Calcium iodide | $CaI_2$ | 3.96 |
| Calcium nitrate | $Ca(NO_3)_2$ | 2.36 |
| Cupric bromate hexahydrate | $Cu(BrO_3)_2.6H_2O$ | 2.58 |
| Cupric bromide | $CuBr_2$ | 2.8 |
| Cupric chloride | $CuCl_2$ | 3.05 |
| Cupric nitrate hexahydrate | $Cu(NO_3)_2.6H_2O$ | 2.07 |
| Ferric chloride | $FeCl_3$ | 2.81 |
| Ferric nitrate hexahydrate | $Fe(NO_3)_3.6H_2O$ | 1.68 |
| Ferric sulfate nonahydrate | $Fe_2(SO_4)_3.9H_2O$ | 2.1 |
| Ferrous bromide | $FeBr_2$ | 4.64 |
| Ferrous chloride | $FeCl_2$ | 2.70 |
| Lead acetate trihydrate | $Pb(C_2H_3O_2)_2.3H_2O$ | 2.55 |
| Lead chlorate monohydrate | $Pb(ClO_3)_2.H_2O$ | 4.04 |
| Lead nitrate | $Pb(NO_3)_2$ | 4.53 |
| Lithium bromide | $LiBr$ | 3.46 |
| Lithium iodide | $LiI$ | 4.06 |
| Magnesium bromide | $MgBr_2$ | 3.72 |
| Magnesium iodide | $MgI_2$ | 4.25 |
| Manganese bromide | $MnBr_2$ | 4.39 |
| Manganese chloride tetrahydrate | $MnCl_2.4H_2O$ | 2.01 |
| Manganese iodide | $MnI_2$ | 5.01 |
| Nickel bromide | $NiBr_2$ | 4.64 |
| Nickel nitrate hexahydrate | $Ni(NO_3)_2.6H_2O$ | 2.05 |
| Potassium acetate | $KC_2H_3O_2$ | 1.8 |
| Potassium carbonate | $K_2CO_3$ | 2.29 |
| Potassium fluoride | $KF$ | 2.48 |
| Potassium iodide | $KI$ | 3.13 |
| Potassium nitrite | $KNO_2$ | 1.92 |
| Potassium phosphate | $K_3PO_4$ | 2.56 |
| Sodium bisulfate | $NaHSO_4$ | 2.74 |
| Sodium bromide | $NaBr$ | 3.20 |
| Sodium chlorate | $NaClO_3$ | 2.49 |
| Sodium chloride | $NaCl$ | 2.16 |
| Sodium hydroxide | $NaOH$ | 2.13 |
| Sodium iodide | $NaI$ | 3.67 |
| Sodium nitrate | $NaNO_3$ | 2.26 |
| Sodium nitrite | $NaNO_2$ | 2.17 |
| Sodium phosphate monobasic | $NaH_2PO_4.2H_2O$ | 1.91 |
| Zinc bromide | $ZnBr_2$ | 2.56 |
| Zinc chloride | $ZnCl_2$ | 2.91 |
| Zinc iodide | $ZnI_2$ | 4.66 |
| Zinc nitrate hexahydrate | $Zn(NO_3)_2.6H_2O$ | 2.06 |
| Zinc sulfate | $ZnSO_4$ | 3.74 |

There are many oil-soluble organic weighting agents which are soluble in the oily phase of the emulsion employed in the practice of the present invention. The oil-soluble organic weighting agents suitably have a specific gravity in the range from about 1.2 to about 4. These organic weighting agents are illustrated in the following table:

TABLE II

*Organic weighting agents*

| Name | Formula | Specific Gravity |
| --- | --- | --- |
| m-Aminobenzoic acid | $NH_2C_6H_4COOH$ | 1.511 |
| n-Amylbromide | $CH_3(CH_2)_3CH_2Br$ | 1.218 |
| iso-Amylbromide | $(CH_3)_2CH(CH_2)_2Br$ | 1.22 |
| tert-Amylbromide | $(CH_3)_2C(Br)_2H_5$ | 1.216 |
| Amylbromide | $(CH_3)_3CCH_2Br$ | 1.26 |
| Amyliodide(n) | $CH_3(CH_2)_3CH_2I$ | 1.51 |
| iso-Amyliodide | $(CH_3)_2CHCH_2CH_2I$ | 1.515 |
| sec(n)-Amyliodide | $C_3H_7CHICH_3$ | 1.507 |
| tert-Amyliodide | $(CH_3)_2CIC_2H_5$ | 1.471 |
| Amyliodide | $C_2H_5CH(CH_3)CH_2I$ | 1.524 |
| Anthracene | $(C_6H_4CH)_2$ | 1.25 |
| Anthraquinone | $(C_6H_4)_2(CO)_2$ | 1.438 |
| Asparagin | $HO_2CCH(NH_2)CH_2CONH_2$ | 1.54 |
| Aspartic acid | $C_4H_7O_4N$ | 1.66 |
| Benzalbromide | $C_6H_5CH:Br_2$ | 1.51 |
| Benzene hexa chloride | $C_6H_6Cl_6$ | 1.89 |
| Benzoic acid | $C_6H_5CO_2H$ | 1.266 |
| Benzanilide | $C_6H_5NHCOC_6H_5$ | 1.31 |
| Benzamide | $C_6H_5CONH_2$ | 1.34 |
| Benzylbromide | $C_6H_5CH_2Br$ | 1.44 |
| Benzyliodide | $C_6H_5CH_2I$ | 1.73 |
| Bromal | $Br_3CCHO$ | 2.665 |
| p-Bromoacetanilide | $BrC_6H_4NHCOCH_3$ | 1.77 |
| Bromoacetophenone | $C_6H_5COCH_2Br$ | 1.65 |
| p-Bromoaniline | $BrC_6H_5NH_2$ | 1.80 |
| Bromobenzene | $BrC_6H_5$ | 1.495 |
| Bromoiodobenzene | $BrC_6H_4I$ | 2.257 |
| Bromoiodoethane (1,1) | $CH_3CHBrI$ | 2.45 |
| 1,2Bromoiodoethane | $BrCH_2CH_2I$ | 2.52 |
| Bromoiodomethane | $BrCH_2I$ | 2.96 |
| Bromonaphthalene | $C_{10}H_7Br$ | 1.605 |
| Bromosuccinic acid | $HOOCCH_2CHBrCOOH$ | 2.07 |
| Bromotoluene | $BrC_6H_4CH_3$ | 1.422 |
| Bromotoluene (m) | $BrC_6H_4CH_3$ | 1.41 |
| Bromotoluene (p) | $BrC_6H_4CH_3$ | 1.39 |
| Bromoform | $CHBr_3$ | 2.89 |
| Butyliodide | $C_2H_5CH_2CH_2I$ | 1.617 |
| Chlorobromobenzene | $ClC_6H_4Br$ | 1.63 |
| Chlorodibromomethane | $BrCH_2CHClBr$ | 2.3 |
| Chlorodiiodomethane | $ClCHI_2$ | 3.17 |
| Chlorodiiodobenzene | $ClC_6H_3I_2$ | 1.95 |
| Chloroiodoethane | $ClCH_2CH_2I$ | 2.1 |
| Chlorotetrabromoethane | $Br_2CHClBr_2$ | 3.4 |
| Chlorotribromoethane | $BrCH_2ClBr_2$ | 2.6 |
| Chlorotribromomethane | $ClCBr_3$ | 2.7 |
| Pentabromoethane | $Br_2CHCBr_3$ | 3.4 |
| Tetrabromoethane (sym) | $Br_2CHCHBr_2$ | 2.96 |
| Iodoform | $CHI_3$ | 4.0 |
| Ethylene Dibromide | $BrC_2H_2Br$ | 2.17 |
| Carbon Tetrachloride | $CCl_4$ | 1.595 |
| Dichlorobromomethane | $Cl_2CHBr$ | 2.01 |
| Dichlorodibromoethane | $Cl_2CHCHBr_2$ | 2.39 |
| Dichlorotribromoethane | $Br_2CClCHBrCl$ | 2.62 |
| Difluorobromoethane | $F_2CHCH_2Br$ | 1.82 |
| Difluorodibromoethane | $Br_2CHCHF_2$ | 2.31 |
| Perfluoro-n-heptane | $C_7F_{16}$ | 1.73 |
| Perfluorotrimethylpentane | $C_8F_{18}$ | 1.80 |
| Perfluoro(o-dimethylcyclohexane) | $C_8F_{16}$ | 1.86 |
| Trifluoroethanol perfluorodibutylether | $(n-C_4F_9)_2O$ | 1.71 |
| Perfluorodiamylether | $(n-C_5F_{11})_2O$ | 1.78 |
| Perfluorodihexylether | $(n-C_6F_{13})_2O$ | 1.81 |
| Perfluorodimethylhexylamine | $C_6H_{11}N(CF_3)_2$ | 1.82 |
| Perfluorodipropylethylamine | $(n-C_3F_7)_2NC_2F_5$ | 1.79 |
| Perfluorotripropylamine | $(n-C_3F_7)_3N$ | 1.82 |
| Perfluorotetraethylethylene diamine | $(C_2F_5)_2NCF_2CF_2N(C_2F_5)_2$ | 1.86 |
| Perfluorotributylamine | $(n-C_4F_9)_3N$ | 1.86 |
| Perfluorotrihexylamine | $(n-C_6F_{13})_3N$ | 1.93 |
| Trichloroethylene | $ClCHCCl_2$ | 1.47 |
| Tetrachloroethane | $C_2H_2Cl_4$ | 1.60 |

In forming the emulsions of the present invention, an emulsifying agent is suitably employed. The emulsifying agent selected from a large group of emulsifying agents is suitably one which will provide an emulsion of the desired heat stability. Where emulsions having heat stabilities up to 200° F. are desired, the emulsifying agent may suitably be sodium lignin sulfonate in combination with a tall oil ester of polyoxyethylene sorbitol, whereas when emulsions of greater heat stability are required other emulsifiers may be used. Selected Polyfons may be used to confer heat stability to emulsions exposed to temperatures of 250° F. and higher. The emulsifying agent may be an alkali metal salt, an alkaline earth metal salt, or an ammonium salt of lignin sulfonic acids. Purified lignin sulfonic acids may be used in forming the alkali metal salts of lignin sulfonic acids. Such salts are known to the trade as the Polyfons and may have from about 3 percent to about 33 percent of alkali metal sulfonate groups. Other emulsifying agents may include the ammonium salts of lignin sulfonic acids, such as those known to the trade as Orzans. There are many emulsifying agents which are suitable in the practice of the present invention, among which specific compounds are sodium lignosulfonate, polyoxyethylene sorbitan monostearate, polyoxyethylene sorbitan monolaurate, polyoxyethylene ether or fatty alcohol, a tallow alcohol-ethylene oxide product, alkylphenoxypolyoxyethylene ethanol, polyoxyethylene lauryl alcohol, polypropylene-polyoxyethylene condensation product, the tall oil ester of polyoxyethylene sorbitol, polyoxyethylene aklyl phenol, the mixed resin and fatty acid esters of polyoxyethylene sorbitol, polyoxyethylene amine, polyoxyethylene stearyl amine, a polyoxyethylene soy bean amine, sorbitan sesquioleate, calcium lignosulfonate, the sodium lignosulfonates containing from about 3.3 percent to about 32.9 percent of sulfonate groups, known as the Polyfons, the Orzans, which are ammonium lignosulfonates, and polymerized ammonium lignosulfonates.

Other compounds which may serve both as film-strengthening agents and as emulsifying agents in preparing the well completion fluids of the present invention may include butylene-maleic acid copolymer, polyacrylates, sulfonated polystyrene, and sulfonated phenol-formaldehyde condensation products or polymer.

In addition to these components of the emulsion, the well completion fluid of the present invention may also employ certain dispersible solids which may be used to stabilize the emulsion. Among the large number of dispersible solids which may be employed may be mentioned attapulgite clay, sodium bentonite clay, a calcium bentonite, finely divided silica, washed and ignited kaolin clay, diatomaceous earth, volcanic ash-lime mixture, volcanic ash, purified pine wood lignin, sulfonated ethyl cellulose, and polyvinyl alcohols.

The emulsion of the present invention will suitably consist essentially of from about 5 percent to about 95 percent by volume of water with a preferred range from about 20 percent to about 80 percent by volume of water, while the oily phase will contain from about 5 percent to about 95 percent of the emulsion with a preferred range from about 20 to 80 volume percent of the emulsion being the oily phase.

In the present invention the oily phase will contain an amount of tetrachloroethylene no less than 10 percent by volume of the oily phase. Suitably the oily phase may consist essentially of tetrachloroethylene and may be 100 percent tetrachloroethylene. However, it may be desirable to employ from about 10 percent to 50 percent by volume of the oily phase as consisting of tetrachloroethylene.

The emulsifying agents of the types illustrated are suitably employed in the present invention in an amount in the range from about 0.5 to about 20 grams per 100 ml. of the external phase of the emulsion. The percent by weight of the inorganic weighting agent or salt dissolved in the aqueous or water phase may suitably range from about 1 percent up to about saturation. The weight percent of the organic compound or weighting agent dissolved in the oily phase may range from about 1 percent up to about saturation.

Where solids are used of the nature illustrated before, the solids may be employed in amounts from about 0.5 gram to about 3.0 grams per 100 ml. of the aqueous phase. These solids are particularly desirable and useful at elevated temperatures encountered in deep wells.

In order to illustrate the invention further, a number of compositions were made up wherein low fluid loss completion fluids were prepared. The following table sets out the several compositions in accordance with the present invention having the desired characteristics.

TABLE III

*Compositions and properties of emulsions containing calcium chloride as the soluble weighting agent*

| Sample No. | External Phase of Emulsion | Aqueous Phase, Vol. Percent | Composition of Aqueous Phase—Film-Strengthening Agent | | Oil Phase | | Emulsifier | | Density, lb./gal. | API Fluid Loss | | | |
|---|---|---|---|---|---|---|---|---|---|---|---|---|---|
| | | | | | | | | | | At Room Temperature | | At Elevated Temperature [b] | |
| | | | Identity | g./100 ml. | CaCl₂, Wt. Percent | Identity | Vol. Percent | Identity | g./100 ml. External Phase | | Before Aging, ml./30 min. | After Aging,[a] ml./30 min. | °F. | ml./30 min. |
| 36 | Water | 50 | | | 40 | Diesel Oil / C₂Cl₄ | 37.5 / 12.5 | Saltkem / OX-298 | 0.5 / 2.0 | 10.0 | 4.2 | | 190 / 250 | 24. / Unstable. |
| 37 | do | 50 | | | 40 | Diesel Oil / C₂Cl₄ | 25.0 / 25.0 | Saltkem / OX-298 | 0.5 / 2.0 | 10.9 | 4.0 | | 190 / 250 | 24.4 / Unstable. |
| 38 | do | 50 | | | 40 | C₂Cl₄ | 50.0 | Saltkem / OX-298 | 0.5 / 2.0 | 12.5 | 3.4 | | 190 / 250 | 18.4 / Unstable. |
| 49 | do | 50 | | | 40 | Diesel Oil / C₂Cl₄ | 30.0 / 20.0 | Polyfon H | 2.0 | 10.5 | 9.0 | | 250 | 46.8. |
| 50 | do | 50 | | | 40 | Diesel Oil / C₂Cl₄ | 25.0 / 25.0 | do | 2.0 | 10.9 | 10.6 | | 180 | 30.4. |
| 51 | do | 50 | | | 40 | Diesel Oil / C₂Cl₄ | 25.0 / 25.0 | do | 2.0 | 10.9 | 13.8 | | 250 | 62.0. |
| 52 | do | 50 | | | 40 | C₂Cl₄ | 50.0 | do | 2.0 | 12.7 | 12.8 | | 250 | 53.0. |

[a] Sample aged in a closed cylinder at 190° F. for 24 hours or longer, then cooled to room temperature and tested.
[b] Tested in a Baroid high-temperature filter press; result doubled to convert it to regular API basis.

It will be seen from an examination of the data in Table III that the composition contained diesel oil and tetrachloroethylene in some instances, and in at least one instance the oily phase consisted of the tetrachloroethylene. The data presented in the foregoing table show that emulsions of low filtration may be produced and that emulsions may be prepared which are heat stable at elevated temperatures; depending on the composition of the emulsion, heat stability at a given temperature may be provided.

In the table OX-298 is the trade name for tall oil ester of polyoxyethylene sorbitol, while Saltkem is the trade name for sodium lignosulfonate. Polyfon H is a sodium lignosulfonate containing about 5.8 percent sulfonate groups which is prepared from purified lignin sulfonic acid.

While sodium chromate is a preferred corrosion inhibitor employed in the present well completion fluids, other corrosion inhibitors may be useful. Among the water-soluble corrosion inhibitors besides sodium chromate may be mentioned tributyl phosphate, calcium hydroxide, Polyrad 1110-A, and F-126. Polyrad 1110-A is a product of reaction between ethylene oxide and a high molecular weight primary amine. F-126 is principally the ammonium salt of perfluorocaprylic acid. Oil-soluble corrosion inhibitors may also be employed in the practice of the present invention, and examples thereof include Rosin Amine D and Texine. Rosin Amine D is a high molecular weight primary amine, and Texine is a proprietary organic compound commonly used in the prevention of corrosion during the pickling of steel and during oil well acidizing operations.

The corrosion inhibitors may be employed in a small but sufficient amount, sufficient to inhibit the corrosivity to ferrous metal tubing and surfaces. An amount of corrosion inhibitor dissolved in one of the phases of the emulsion may range from about 0.001 to about 5 percent by weight of said phase.

The Orzans are a new series of surface active chemicals derived from the by-products of wood pulping by the sulfite process using an ammonia base. In this process, wood chips consisting of about 90 percent western hemlock and 10 percent white fir are placed into a digester containing ammonium bisulfite and excess sulfur dioxide. The mixture is then cooked for about 8 hours at a temperature of about 290–300° F., while a pressure of 70–80 p.s.i. is maintained within the digester. After the cooking period, the mixture is filtered to separate the wood pulp from the bisulfite liquor.

Orzan A is obtained by concentrating the liquor by evaporation to about 50 percent solids, and then spray-drying the concentrated liquor. Orzan A, therefore, is an unaltered by-product of the pulping process containing ammonium lignin sulfonate and wood sugars.

Orzan S is a sodium salt of lignin sulfonate and is obtained by adjusting the concentrated ammonium bisulfite liquor to pH 7.0–7.5 with sodium hydroxide. At a pH of 7.0–7.5 the excess ammonia is driven off and the concentrated liquor is spray dried to obtain a free flowing powder.

The Orzans AH0, AH1, AH2, and AH3 are made by partially polymerizing the lignin sulfonate units present in Orzan A, increasing their average molecular weight. The member having the highest molecular weight is Orzan AH3.

The Polyfons are a new series of surface active chemicals based on lignin obtained as a by-product of pulping wood chips using the kraft process. In the kraft or sulfate process, the lignin is rendered soluble by digesting wood chips at about 160–180° C. with a mixture of one part of sodium sulfide and two parts of sodium hydroxide as a 5 percent solution. From the kraft black liquor the lignin, together with some hemicellulose, is precipitated by acidification with mineral acid. The lignin obtained in this manner is purified and then sulfonated to provide the various lignosulfonates such as Polyfon H, XQ, O, T, R, and F.

A more complete description of processes used in the isolation of lignin and the various lignin sulfonates, i.e., the kraft, soda, and sulfite processes, is given in a book entitled Cellulose and Cellulose Derivatives by E. Ott, H. Spurlin, and M. Grafflin, Interscience Publishers, Inc., New York, ed. 2, part 2, pages 524–545.

The well completion fluids of the present invention are quite useful in wells as completion fluids and as perforating fluids. For example, the compositions are useful as completion fluids to protect perforations from contamination by the drilling fluids and other fluids which may be found in a well bore. For example, if perforation operations are conducted, and it is desirable to rework the well at a vertically spaced apart zone in the well, it may be desirable to protect the existing perforations while the operation is being conducted in the other zone in the well. In that event, the existing perforations would be protected or blanketed by an emulsion of the present invention, while these operations, such as perforating, cementing, treating, fracturing, and the like, were conducted at a vertically spaced apart location.

Likewise, the well completion fluids of the present invention are useful as perforating fluids in that the perforations do not become plugged with debris from the well or with any other material from the formation. In other words, by perforating in an emulsion in accordance with the present invention, not only are the formations prevented from being damaged, but the perforations remain clean of material which might result in a productive hydrocarbon formation being overlooked.

The well completion fluids of the present invention may also be suitably used as fracturing fluids. In other words, where there is a formation of a low permeability and it is desirable to open up a channel therein, the completion fluids of the present invention may be pumped under high pressure into the formation to cause a lifting of the over-burden and thereafter allow an increase in permeability and production of the hydrocarbons contained in the fractured formation.

There are many uses of the well completion fluids of the present invention which will occur to the skilled workman. It is contemplated that the completion fluids of the present invention may be employed to blanket or protect perforations or formations which are exposed in a well while operations are conducted at another location in the well. Likewise, it is contemplated that the existing perforations or exposed faces of formations may be protected while an operation is conducted where the exposed face exists or where the perforations exist.

In order to illustrate the present invention further, a well in Harris County, Texas, was treated to block communication behind the casing between two sands by squeeze-cementing the channel behind the casing. An existing producing interval was to be covered with a nonplugging emulsion of the present invention during the workover operation to protect the perforations.

In this particular operation, the well was killed by circulating formation salt water into the well through production tubing set at about 6594 feet. Two and one-half barrels of an emulsion weighing 10½ pounds per gallon and containing Polyfon H as emulsifying agent was employed. This emulsion had a fluid loss of 9 ml. in 30 minutes at atmospheric temperature. The stated amount of the emulsion was circulated to the bottom of the tubing with salt water, and the casing return line was closed. The emulsion was displaced down the tubing displacing the salt water until the body of emulsion covered the perforations. Pumping pressure was about 1100 pounds per square inch when the pumping operation ceased. Pressure in the tubing decreased from 1100 pounds per square inch to 700 pounds per square inch in ten minutes, but held at this point until the casing return line was opened to allow bleedoff of pressure.

The well was then circulated above the body of emulsion with 10 pounds per gallon of mud and the production tubing was pulled. The casing was then perforated at about 6400 to about 6402 feet employing a casing jet gun. Cementing equipment was set opposite the perforations at 6400 to 6402 feet, and 85 sacks of a slow-set cement were squeezed into the perforations. After the cement had set, the cement plug was drilled out and the production equipment run. The well was then swabbed in, and the production rate from the perforations from 6620 to 6622 feet returned to the original value without any difficulty. Since production from the protected interval was regained without difficulty, it was clearly demonstrated that the improved emulsion forms a protective blanket for existing perforations wherein workover operations were conducted at a point vertically displaced in the well.

In another operation in Southwest Texas, it was desired to cement existing perforations in a well casing and to recomplete the well in an upper zone. Thus, cement was squeezed into existing perforations from about 9080 to 9100 feet. With 10.4 pounds per gallon mud in the well, 15 barrels of fresh water were located from about 7400 to 8120 feet, and 12 barrels of 10.9 pounds per gallon empulsion which contained diesel oil in the oily phase and Polyfon H as the emulsifying agent were located from 6660 to 7200 feet. A packer was set at 7180 feet, and the casing was perforated from 7131 to 7144 feet and from 7149 to 7156 feet with four shots per foot using a casing jet gun. Production tubing equipped with dual permanent-type completion equipment was set at 7113 feet.

The well was swabbed and failed to flow. After swabbing, the tubing was filled with oil and an attempt made to fracture the formation. The formation did not break down under 5000 pounds per square inch pressure. Another zone was perforated at 8180 to 8192 feet and 8105 to 8215 feet using the same number of shots per foot with mud opposite the perforations employing a casing jet gun. The tubing with dual type completion equipment and a straight flow choke was reset between the two intervals and the lower zone in the well was flowed to the waste pit in the tubing.

Tubing pressure was 1025 pounds per square inch while the well was flowing. Production from the casing side through the protected perforations from 7131 to 7144 feet and from 7149 to 7156 feet flowed at the rate of 1491 M c.f. gas per day. The calculated open flow potential was 16,500 M c.f. gas per day from the protected interval.

An emulsion comprising saturated calcium chloride solution, Saltkem, OX-298, diesel oil, and tetrachloroethylene was used as a perforating fluid in a Southwest Texas well. The purpose of the workover job was to exclude the production of water from the existing perforations and to recomplete the well in an upper zone.

The plugback squeeze job was performed against the existing perforations at 6910 to 6922 feet and 10 feet of cement was left on top of a packer set at 6885 feet. With mud in the well, 20 bbl. of the 11.5 pound per gallon emulsion were spotted in the 5½-inch casing from about 6170 to about 6600 feet. The interval from 6483 to 6496 was perforated with four shots per foot using a casing-jet gun, and the tubing equipped with a drill-stem-test tool was set above the perforated interval in preparation for testing. The drill-stem-test tool was opened for 8 hours and 40 minutes and then closed for 2 hours and 40 minutes. During a 4-hour interval of this test, the well produced at the rate of 83 barrels of oil per day through a ⅛-inch choke with a maximum surface pressure of 1525 p.s.i. After the test had been completed, the tubing equipped with a packer was set at 6339 feet, and the well was allowed to flow. The well produced 87 barrels of 43.0 API gravity oil from the 6483 to 6496 foot interval through an 11/64-inch choke. The tubing pressure while the well was flowing was 600 p.s.i., and the gas-oil ratio was 1676 cubic feet per barrel.

In addition, a considerable number of other field perforating jobs have been made with emulsions having a similar composition as that used in the immediately preceding example; in these operations emulsions having densities ranging from 10 to 12 pounds per gallon were used in amounts in the range from 5 to 20 barrels.

In addition, an emulsion comprising saturated calcium chloride solution, Saltkem, OX-298, and tetrachloroethyene was used as a blanketing fluid in a well in the Gulf Coast of Texas.

The purpose of the workover job was to treat the well with a production stimulant and to protect the treated formation with a blanket of non-plugging emulsion until the well could be produced.

The pump, rods and tubing were pulled out of the 5-inch casing and tubing equipped with a packer was set at 7295 feet. Eighty-eight barrels of 1 percent well stimulant dissolved in lease oil was pumped into the formation through the perforations from 7361 feet to 7368 feet. Five barrels of non-plugging emulsion were pumped into the tubing behind the stimulant oil solution to protect the newly treated formation from salt water. The tubing and packer was pulled and reset with a pump and rods to produce the well. After a six day pumping test, the well produced 28 barrels of fluid per day with 5 percent salt water.

The nature and objects of the present invention having been completely described and illustrated, what we wish to claim as new and useful and secure by Letters Patent is:

1. A well completion fluid stable at well temperatures consisting of an aqueous phase and an oily phase, the aqueous of said phases containing a water soluble weighting agent, said oily phase containing no less than 10% by volume of tetrachloroethylene, a corrosion inhibitor dissolved in one of said phases in a corrosion inhibiting amount, and an emulsifying agent suitable and in an amount sufficient to form said phases into a heat stable emulsion at well temperatures ranging up to 250° F.

2. A well completion fluid in accordance with claim 1 in which the oily phase comprises a hydrocarbon having a viscosity at 60° F. less than about 40 centipoises and in which the oily phase comprises from about 5% to about 95% by volume of said emulsion.

3. A well completion fluid in accordance with claim 1 in which the corrosion inhibitor is sodium chromate dissolved in the aqueous phase of the emulsion.

4. A well completion fluid in accordance with claim 1 in which the aqueous phase contains a water-soluble inorganic metal salt as a weighting agent.

5. A well completion fluid in accordance with claim 1 in which the oily phase contains an oil-soluble organic compound as a weighting agent.

6. A well completion fluid in accordance with claim 1 in which the oily phase comprises diesel oil.

7. A well completion fluid in accordance with claim 1 in which the oily phase comprises kerosene.

8. A well completion fluid in accordance with claim 1 in which the oily phase comprises gasoline.

9. A well completion fluid in accordance with claim 1 in which the oily phase comprises gas oil.

10. A well completion fluid in accordance with claim 1 in which the emulsifying agent is a salt of lignin sulfonic acid.

11. A well completion fluid stable at temperatures in the range up to 200° F. in accordance with claim 1 in which the emulsifying agent is a mixture of sodium lignin sulfonate and a tall oil ester of polyoxyethylene sorbitol.

12. A well completion fluid stable at well temperatures consisting of an aqueous phase and an oily phase, the aqueous of said phases containing a water soluble weighting agent, the aqueous phase consisting essentially of from about 5% to about 95% by volume of the emulsion and the oily phase consisting essentially of from about 5% to about 95% by volume of the emulsion, said oily phase containing from about 10% to about 100% by volume of tetrachloroethylene, and one of said phases containing from about 0.001 to about 5% by weight of a corrosion inhibitor, and an emulsifying agent in an amount in the range from about 0.5 to about 20 grams per 100 ml. of the external phase of the emulsion suitable to form a heat stable emulsion at well temperatures ranging up to 250° F.

13. A well completion fluid in accordance with claim 12 in which the oily phase comprises diesel oil.

14. A well completion fluid in accordance with claim 12 in which the corrosion inhibitor is sodium chromate.

15. A well completion fluid stable at well temperatures in the range up to 200° F. consisting of an aqueous phase and an oily phase, the aqueous phase consisting of a saturated solution of calcium chloride in an amount from about 5% to about 95% by volume of the emulsion and the oily phase consisting of from about 5% to about 95% by volume of the emulsion and containing from about 10% to about 100% by volume of tetrachloroethylene, the aqueous phase containing from about 0.001% to about 5.0% by weight of sodium chromate as a corrosion inhibitor, and an emulsifying agent in an amount in the range from about 0.5 to about 20 grams per 100 ml. of the external phase of the emulsion consisting of a mixture of sodium lignosulfonate and tall oil ester of polyoxyethylene sorbitol.

16. A well completion fluid stable at well temperatures in the range up to 250° F. consisting of an aqueous phase and an oily phase, the aqueous phase consisting of a saturated solution of calcium chloride in an amount from about 5% to about 95% by volume of the emulsion and the oily phase consisting of from about 5% to about 95% by volume of the emulsion and containing from about 10% to about 100% by volume of tetrachloroethylene, the aqueous phase containing from about 0.001% to about 5.0% by weight of sodium chromate as a corrosion inhibitor, and an emulsifying agent in an amount in the range from about 0.5 to about 20 grams per 100 ml. of the external phase of the emulsion consisting of an alkali metal salt of purified lignin sulfonic acids.

17. A well completion fluid in accordance with claim 12 in which the emulsifying agent is an ammonium salt of lignin sulfonic acids.

18. A well completion fluid in accordance with claim 12 in which the emulsion consists of equal volumes of the aqueous phase and the oily phase and in which the oily phase consists of a mixture of diesel oil and tetrachloroethylene and the emulsifying agent is an alkali metal salt of purified lignin sulfonic acids.

References Cited in the file of this patent

UNITED STATES PATENTS

| | | |
|---|---|---|
| 1,829,705 | Walker | Oct. 27, 1931 |
| 2,073,413 | Cross et al. | Nov. 25, 1936 |
| 2,297,660 | Mazee | Sept. 29, 1942 |
| 2,476,845 | Dawson | July 19, 1949 |
| 2,661,334 | Lummus | Dec. 1, 1953 |
| 2,748,084 | DeLew et al. | May 29, 1956 |
| 2,764,242 | Rohrback et al. | Sept. 25, 1956 |
| 2,805,722 | Morgan et al. | Sept. 10, 1957 |